Dec. 6, 1938.    S. G. STUCKEY    2,138,986
VALVE
Filed June 27, 1935
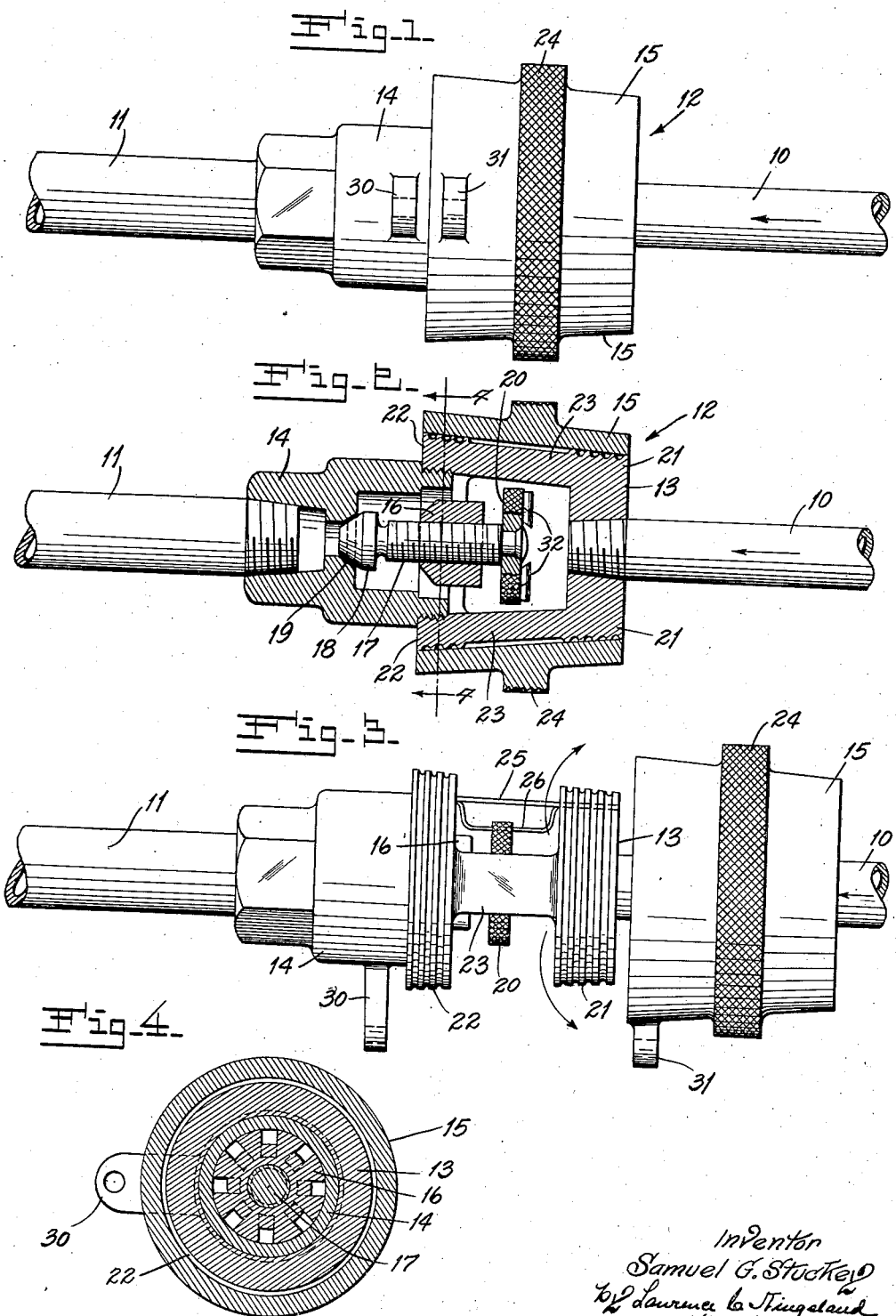
Inventor
Samuel G. Stuckey
by Lawrence Ca Kingsland
His Attorney.

Patented Dec. 6, 1938

2,138,986

UNITED STATES PATENT OFFICE 2,138,986

VALVE

Samuel G. Stuckey, St. Louis, Mo., assignor to Obear-Nester Glass Company, St. Louis, Mo., a corporation Application June 27, 1935, Serial No. 28,593

15 Claims. (Cl. 277—57)

This invention relates to a valve for use in air lines or other similar fluid conductors. A particular means is designed for adjusting this valve and likewise a mechanism for giving a warning when the valve is being adjusted.

It is an object of this invention to provide a valve of this kind, access to the working parts of which may readily be had.

It is a further object to provide a valve of this type having an enclosed adjustment feature that is easily and quickly actuable, and closure means for the valve that is quickly removable, whereby the valve may be adjusted without requiring an extended cessation of the operation being performed by the fluid running through the valve.

It is a further object of this invention to provide means for adjusting the valve, so located and constructed that, when adjustments are being effected, a warning of such change will be given.

A further object is to provide novel means in the combination for preventing involuntary variation of the valve adjustment.

An additional object is to provide this warning by means of an audible signal.

In the art of glass making, which may be referred to as one use to which this valve is adapted, control of the feeding and forming means is frequently effected by means of air pressure actuated mechanisms. Variations in the operation of these mechanisms may be obtained by varying the quantity of compressed air flowing to them. The various mechanisms require fine adjustment for the proper production of ware. For different sizes and shapes of ware, these adjustments must be made, and at present the means used to adjust the supply of air in the several lines are needle valves. As the machine must be synchronized, in its various elemental operations, these adjustments are generally made by an expert.

After the adjustment is made, and the machine is in operation, it is turned over to a less experienced operator, whose duties are restricted. This operator is not entrusted with adjustment of these valves. Despite prohibitions, there is a tendency on the part of the operators to tamper with the valves, which destroys the synchronization of the several functions of the machine.

The invention provides a valve so constructed that if an operator attempts to adjust it, an audible warning will be sounded, notifying the superintendent that the valves are being tampered with. This alarm may be a hissing sound of escaping air, or it may be a whistle, as will be shown.

Likewise, tampering with the valve will shut down the machine. To insure this result, the valve is enclosed in the fluid line by means of a housing and this housing must be opened before the valve can be changed. Upon opening the housing, the air supply reaching the mechanism is cut off, due to its escape to atmosphere and the operation is stopped. Upon thus opening the housing, the warning is sounded.

It is desirable at times to stop some particular operation of the machine without disturbing the setting of the valve. To accomplish this, the device may be opened, thus opening the air line to the part of the machine in question.

Such an opening of the air line also provides an additional function. Condensation occurs in the several air lines and causes trouble in the operations. The usual water trap in the main line does not correct this trouble. By using one of the present valves in each of the lines to the several elements of the machine, this trouble may be obviated. By opening the valve device, the escaping air will blow out this condensate from its particular line.

This valve provides a very quick means to stop the machine, as it may be opened by simply withdrawing a sleeve, opening up the air line. This is of great value in case of accident, in view of the fact that needle valves require several turns before they can be closed.

This valve has been designed to attain all the above objectives, together with those set out hereinbelow.

In the drawing:

Fig. 1 is a side elevation of the device closed.

Fig. 2 is a diametrical section through Fig. 1.

Fig. 3 is a plan view of the device shown in Fig. 1 with the cover removed.

Fig. 4 is a section on the line 4—4 of Fig. 2.

For illustration of a device upon which this valve may be used, reference is made to this applicant's Patent 1,686,109 of October 2, 1928, disclosing an air controlled feeder mechanism. A valve such as is herein described may be used in any of the lines of this feeder mechanism.

Referring particularly to the drawing, an air inlet pipe is shown at 10 and an air outlet pipe at 11. Between these is located the valve which may be generally designated 12 in Fig. 1. The valve housing comprises essentially two parts. The first is a connecting member 13 secured as by threads to pipe 10. To this connecting member and to pipe 11 is secured a second connecting member 14. In view of the fact that member 13 is open, there is provided a removable sleeve or closure 15 that may be slipped over the connecting member 13 to form an airtight seal therewith.

Formed as a part of connecting member 13 is a spider 16 having a central boss member into which is threaded the valve stem 17. A valve 18 on the stem 17 engages with the seat 19. A valve actuated handle here shown as being in the form of a knurled wheel 20 is secured to the end of the stem 17 opposite the head 18. Thus by rotation of handle 20, the head may be moved against the seat 19 to close off the flow of air through the valve or it may be adjusted a predetermined distance off the seat in order to permit the desired quantity of air to flow into the outlet line 11.

It will be seen that the connecting member 13 has two end portions 21 and 22 that are joined by two webs 23. The end portions 22 and 21 are both tapered as portions of the same conical surface and each has ridges or grooves circumferentially therearound to effect a tight closure. The cap 15 has an inner conical surface corresponding to that of the end portions 21 and 22 so that it may be slid over these two surfaces to form a tight seal with both. For operation of the cap member, a knurled surface 24 may be formed thereon.

In order to secure the valve in adjusted position, a detent means may be provided, here shown as being of the bow spring type. Between the end portions 21 and 22 and spaced from the connecting webs 23 is a cross rod 25 rigidly secured to the said end members. To this cross rod is fixed a bow spring 26 that is inherently urged strongly to a radial position, so that it is maintained forcibly against the knurled handle 20. This will prevent involuntary rotation of the knurled wheel, although it may be manually adjusted against the action of the detent.

In order to lock the valve in closed position, if such is desired, ported ears 30 and 31 may be supplied on the connecting member 14 and the closure 24. A padlock may be engaged through these ears. The ears may also be used for sliding the closure 15 to open or closed position, in place of the knurled portion 24.

For reasons to be pointed out, whistles 32 may be located on the adjusting wheel 20. These whistles are placed radially on the wheel and have their mouth ends toward the center, in order to receive air emitted from the inlet pipe 10.

The operation of the device is as follows: As shown in Fig. 2, air may flow from the inlet pipe 10 into the housing, around the valve and out the outlet 11. In this figure, the device is shown in its operative condition. Should it be desired to adjust the valve, the operator grasps the knurl 24 or ear 31 on the cap 15 and slides the closure member off the smaller end of the conical surface to the position shown in Fig. 3. He then rotates the knurled wheel 20 to obtain the proper adjustment of the valve. The valve, of course, will be maintained in this adjustment by the detent mechanism 26. He then forces the cap 15 back over the conical surface of the end portions 21 and 22.

As soon as the cap is drawn off, the air from the inlet 10, impinges with great velocity on the head 20 and the web 23, and escapes out of the valve housing. By thus impinging, it causes a loud hissing sound audible for some distance and gives warning of the fact that the machine is being adjusted. If the whistles 32 have been provided, the air will escape through them and they will sound a sharp warning.

In case it is desired to stop the mechanism controlled by this valve, the sleeve 15 is removed. Air then escapes and does not pass through the outlet 11 to the mechanism, so that the latter ceases operation. If the mechanism is to be stopped for an extended time, the needle valve may be turned down against its seat, thus closing off the outlet, and the closure 15 replaced. This prevents escape of the air with consequent waste.

Should condensate collect in any of the lines in which one of these valves is used, removal of the closure sleeve 14 permits the escape of the compressed air at high velocity. In escaping the air will blow any condensate from the line.

It will be seen this operation of valve adjustment is the work of but a few seconds since there are no parts to be completely removed or unscrewed. Likewise in case of emergency the easy removal of the closure sleeve 15 stops the mechanism immediately.

Wherefore it will be seen that a valve has been provided having many desired features as previously pointed out throughout this specification.

What is claimed is:

1. In a device of the kind described, a valve housing having an open portion, a valve adjustably mounted therein, a closure member frictionally mounted for quick removal on said housing to close the same, said removable closure member permitting ready access to the interior of the housing through the open portion, for adjusting the valve, and means within the housing disposed for impact by fluid passing through the device to effect in cooperation therewith when the closure is removed during active use of the device a warning that the said closure has been removed.

2. In a device of the kind described, a valve housing, a valve adjustably mounted therein, said housing having an open portion to permit access to and adjustment of the valve, and a sleeve member frictionally engaging the housing and removably encircling the open portion to close the same, said sleeve member being adapted to be substantially instantly removed from covering position whereby rapid access may be had to the valve for adjustment thereof.

3. In a device of the kind described, a valve housing, means to connect said housing in a fluid line, a valve mounted adjustably in said housing and controlling the fluid flow through said line, said housing having surface portions spaced by openings through which said valve is accessible, and a closure adapted for quick sliding movement removably engaging said surface portions in sealing relation closing said openings.

4. In a device of the kind described, a valve housing, means to connect said housing in a fluid line, a valve mounted adjustably in said housing and controlling the fluid flow through said line, said housing including a portion having spaced grooved surfaces extending completely therearound and having an open portion therebetween, and a closure device having an internal surface engageable with said spaced surfaces in sealing relation therewith.

5. In a device of the kind described, a valve housing, a valve adjustably mounted therein, said housing including a portion having spaced grooved peripheral surfaces that are sections of the same conical surface, and between which said valve is accessible, and a closure member having internal conical surface means adapted to engage said spaced surfaces in sealing relation, and to be readily removable therefrom.

6. In a device of the kind described, a valve housing, a valve adjustably mounted therein, means for adjusting said valve, said housing comprising two end portions and web means joining said end portions, said web means providing space rendering said adjustment means accessible, and closure means adapted to engage said portions in sealing relation.

7. In a device of the kind described, a valve housing adapted to be connected into a fluid line, said housing having an open portion, a valve in said housing to control the flow of fluid in said line, means on said device against which fluid is adapted to impinge under pressure, means for adjusting said valve, and a removable closure means for said open portion, whereby, when said closure means is removed, fluid impinging upon the means described will escape with an audible noise, the removal of said closure permitting access to the valve adjusting means.

8. In a device of the kind described, a valve housing, a valve mounted therein, rotary means for adjusting said valve, means engaging said rotary means to prevent involuntary adjustment of said valve but permitting voluntary adjustment thereof, and cover means adapted to close said housing to enclose said valve, said adjusting means, and said means engaging said rotary adjusting means.

9. In combination, an air line, an adjustable valve device in said line, and means for venting air in said line before said valve may be adjusted, said means including a housing supporting and surrounding said valve, said housing having an opening on the inlet side of the valve seating position, a device against which air in the line impinges, and a cover for the opening, said valve being accessible for adjustment only through said opening.

10. In combination, a fluid line, a valve therein, a housing enclosing said valve, said housing having a fluid inlet on one side of said valve, and a fluid outlet on the other side thereof, means for adjusting said valve, said housing being open on said inlet side to give access to said adjusting means, said opening permitting fluid from the inlet to exhaust, and means for closing said opening.

11. In a device of the kind described, a bi-sectional housing, one of said sections having an open portion, an adjustable valve supported by said open section and having seating engagement with the other section, and resilient means engaging said valve to prevent involuntary adjustment but allowing voluntary adjustment thereof.

12. In combination with a pipe line for carrying air under pressure, a housing in said line, said housing having an open portion, a substantially instantaneously removable sealing cover for said open portion, an adjustable flow control valve seating in the housing, said valve being adjustable through said open portion, and means in said housing on the inlet side of the valve seat for diverting the air from its flow path, whereby when said cover is removed the air will escape to atmosphere through the said open portion, for stopping any mechanism actuated by the air.

13. In a device of the kind described, a bi-sectional housing, one of said sections having an open portion, a cover for said open portion, and a valve adjustably supported by said section having the open portion and adapted to have seating contact with the other section, said valve being adjustable only through said opening, said opening allowing fluid to escape upflow of the valve when said cover is removed for making valve adjustments.

14. In a device of the kind described, a housing having an open section, said section having external surfaces as spaced zones of a cone, and a cover having an internal surface in the form of the zone of a cone longitudinally extensive to contact the zones of the cone of the section through sliding engagement to seal the opening.

15. In a device of the kind described, a bi-sectional housing for insertion in a pipe line, one of said sections comprising end portions connected by web members thereby providing openings, a removable sliding cover for engaging said end portions to seal the openings, pipe connecting means in each section, an adjustable valve supported by the section having the openings, a valve seat in the other section on which the valve seats, a knurled adjusting wheel on the valve remote from the seat, said wheel further serving as a means against which fluid under pressure and relatively high velocity is adapted to impinge and be diverted from its normal flow path, whereby when said cover is removed, such fluid will be vented to the atmosphere with a warning noise, such venting further cutting the fluid supply to any mechanism actuated thereby resulting in a stopping of the same.

SAMUEL G. STUCKEY.